April 6, 1937.  E. B. PAYNE  2,075,956
ELECTRIC WAVE TRANSLATING SYSTEM
Filed May 11, 1935  3 Sheets-Sheet 1
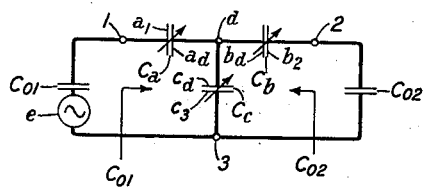
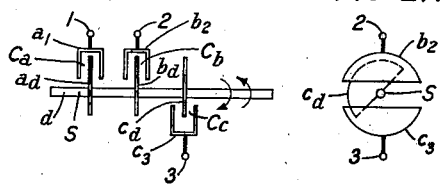
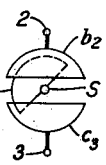
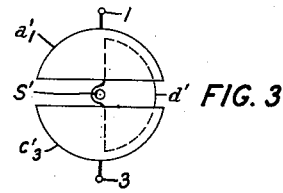
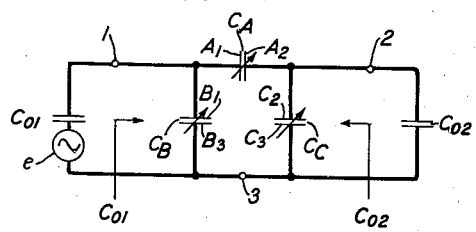
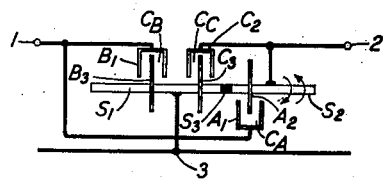
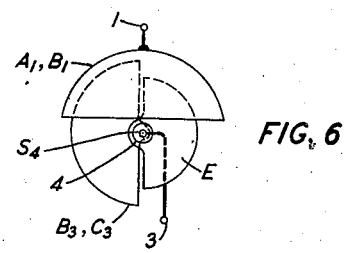
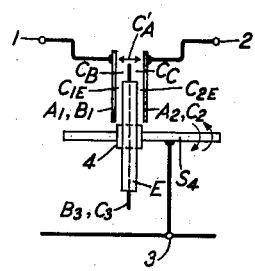
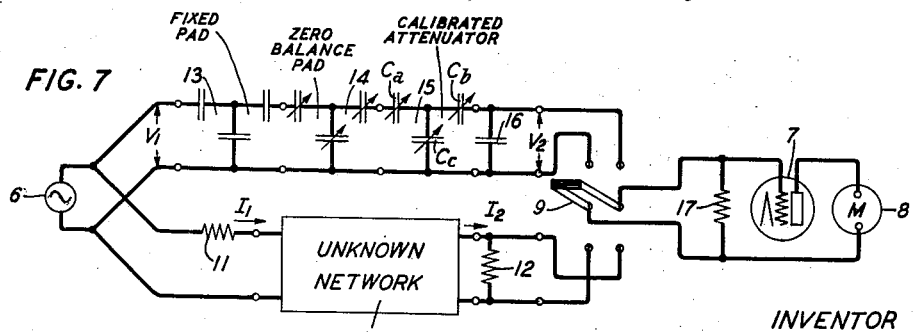
INVENTOR
E. B. PAYNE
BY
ATTORNEY April 6, 1937.                    E. B. PAYNE                    2,075,956
                        ELECTRIC WAVE TRANSLATING SYSTEM
                    Filed May 11, 1935            3 Sheets—Sheet 2
FIG. 8                                              FIG. 9
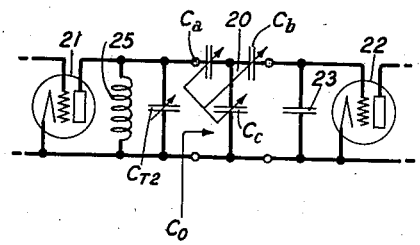
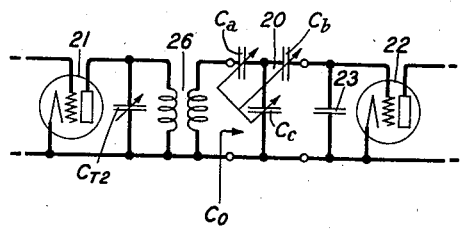
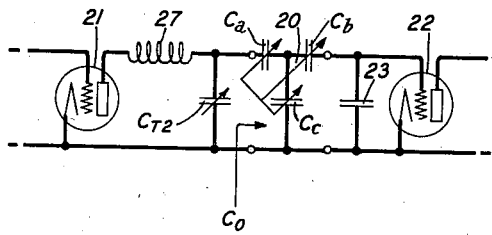
FIG. 10
FIG. 11
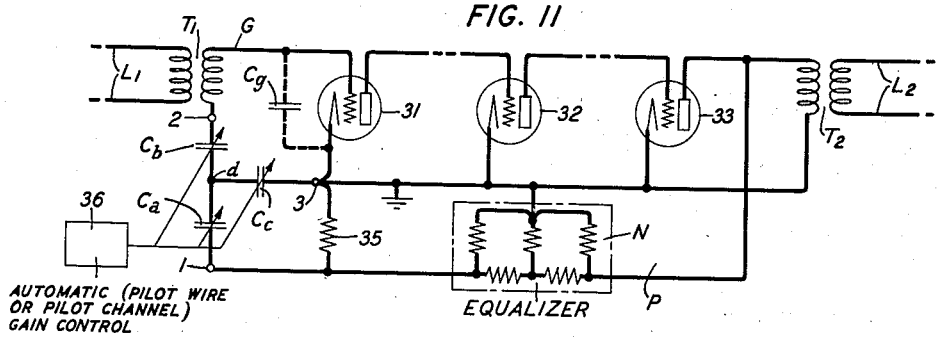
FIG. 12
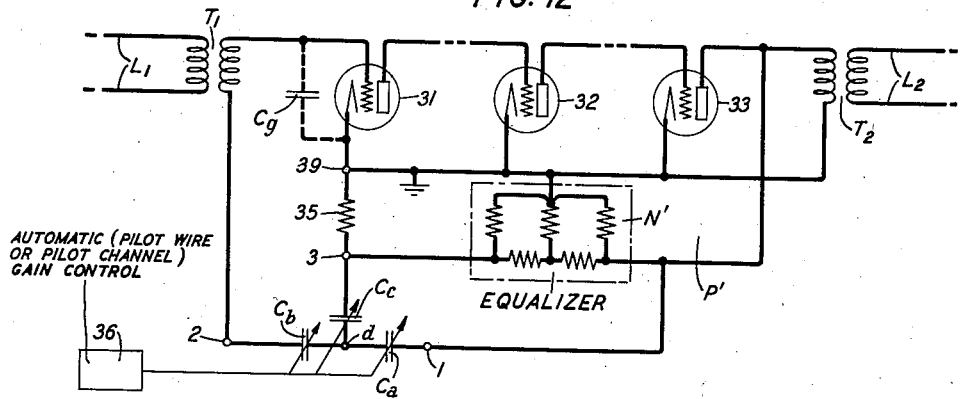
INVENTOR
E. B. PAYNE
BY
        ATTORNEY Patented Apr. 6, 1937

2,075,956

UNITED STATES PATENT OFFICE 2,075,956

ELECTRIC WAVE TRANSLATING SYSTEM

Edward B. Payne, New York, N. Y., assignor to Bell Telephone Laboratories, Incorporated New York, N. Y., a corporation of New York Application May 11, 1935, Serial No. 20,951

5 Claims. (Cl. 178—44)

This invention relates to electric wave translating systems.

Objects of the invention are to control wave amplitude and phase, as for example to control gain and phase relations in negative feed-back amplifying systems.

A division of this application, filed Dec. 21, 1935, Serial No. 55,549, claims a three-terminal, three-capacity attenuating network, for example a T or $\pi$ network of condensers, with means for relatively moving the plates or armatures of each of the condensers simultaneously, to vary the attenuation of the network, the condensers having their armatures shaped to produce a prescribed relation between the attenuation of the network and its image capacities, for instance to cause the image capacities to remain constant as the attenuation varies.

Certain features of the present invention relate to specific applications of these variable condenser networks, as for example their application to automatic compensation of transmission line attenuation variations produced by weather changes.

In one specific aspect the invention is an automatic gain control system for compensating for attenuation variations produced in a carrier telephone line by weather changes to which the line is subjected. A negative feed-back amplifier in the line has in its feed-back path an attenuation equalizer such for example as is disclosed in H. S. Black Patent 1,956,547, May 1, 1934, and a T-network of condensers such as that referred to above, the condenser network being operable to adjust the attenuations of the feed-back path and consequently the gain of the amplifier. The condenser network may have two of its arms connected across the output of the equalizer, or a portion of a terminating impedance for the equalizer, to serve as a variable ratio voltage divider, and its third arm connected in series with the incoming circuit with respect to the grid-cathode path in the first tube of the amplifier, to correct for error caused by the impedance into which the equalizer works, whether due to the other two arms of the T-network or to the remaining impedances attached to the equalizer output (i. e. the equalizer terminating resistor, the amplifier input transformer or incoming circuit and the amplifier grid circuit that the incoming circuit feeds). The T-network of condensers may be adjusted by means responsive to effects of the weather changes to which the transmission line is subjected. This means may be of any suitable type, as for example a pilot wire gain adjuster control system of the type disclosed in the above-mentioned patent.

Other objects and aspects of the invention will be apparent from the following description and claims.

Figs. 1 to 6A show three-way variable condenser units referred to above, Figs. 1 to 3A being T-networks and Figs. 4 to 6A being $\pi$ networks;

Fig. 7 shows schematically an embodiment of such a unit in a transmission loss measuring circuit;

Figs. 8 to 10 show schematically three embodiments of the invention as tuned amplifiers;

Figs. 11 and 12 show embodiments of the invention as transmission equalizing systems.

Figure 13:
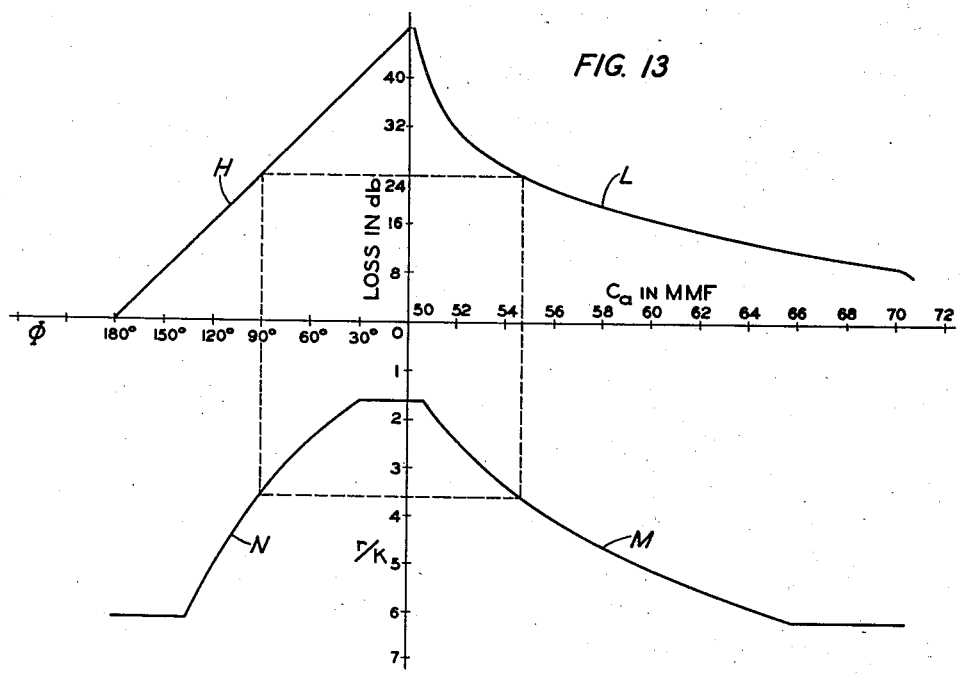
Figs. 13 and 14 show curves illustrating a method of determining suitable shapes for condenser plates.

In Fig. 1, a T-network of capacities $C_a$, $C_b$ and $C_c$ forms a variable attenuator for waves transmitted therethrough, for example, from terminals 1 and 2 to terminals 3 and 2. The network is shown terminated in its image capacities $C_{01}$ and $C_{02}$, a source of voltage $e$ being indicated in series with the terminating capacity $C_{01}$.

Capacity $C_a$ comprises plates or armatures $a_1$ and $a_d$, which may be relatively movable for varying the capacity $C_a$; capacity $C_b$ comprises armatures $b_2$ and $b_d$, which may be relatively movable for varying the capacity $C_b$; and capacity $C_c$ comprises armatures $c_3$ and $c_d$, which may be relatively movable for varying the capacity $C_c$. The portion of the T-network at the potential of plates $a_d$, $b_d$ and $c_d$ is designated $d$. Means may be provided, for example, as indicated in Figs. 2 and 2A or Figs. 3 and 3A described hereinafter, for varying the capacity $C_c$ simultaneously with and in opposite sense to the capacities $C_a$ and $C_b$, the capacity $C_c$ increasing when $C_a$ and $C_b$ decrease, and the capacity $C_c$ decreasing when $C_a$ and $C_b$ increase. In accordance with the invention, the condenser plates, though shown as segments of circles for the sake of simplicity and clearness, may be shaped, as explained hereinafter, to give the following properties:

(1) Image capacities at each end of the network independent of the setting of the plates associated with attenuation which varies with the plate setting, (i. e., image capacities independent of attenuation variation);

(2) The image capacities independent of the plate setting, as in (1) and different from each other; and (3) Image capacities and attenuation which are both dependent in any desired way on the plate setting.

These properties may be obtained by designing the attenuator, as explained hereinafter, in accordance with formulae which relates the network capacities $C_a$, $C_b$ and $C_c$ with its image capacities $C_{01}$ and $C_{02}$ and its attenuation constant $\theta$, which is the real part of the transfer constant, the imaginary part being zero. These formula are:

$$C_a = \frac{C_{01}\sqrt{C_{02}} \sinh \theta}{\sqrt{C_{02}} \cosh \theta - \sqrt{C_{01}}} \qquad \text{I}$$

$$C_b = \frac{C_{02}\sqrt{C_{01}} \sinh \theta}{\sqrt{C_{01}} \cosh \theta - \sqrt{C_{02}}} \qquad \text{II}$$

$$C_c = \sqrt{C_{01}C_{02}} \sinh \theta \qquad \text{III}$$

Here $\theta$ is expressed in nepers. The significance of image capacity is apparent from the relation, $$Z_I = 0 + \frac{1}{j\omega C_I}$$

where $Z_I$ is image impedance and $C_I$ is image capacity. When $$C_a = C_b$$

the image capacities $C_{01}$ and $C_{02}$ are equal and the T is symmetrical. Networks designed to have the property (1) or the property (2) above have the important property:

(4) The network exhibits a constant capacity at one end independent of plate setting when the other end is terminated in its image capacity.

The variable attenuator of Fig. 1 may be realized for example in the structure shown in Figs. 2 and 2A, which are, respectively, a front elevation and a right side or right end elevation of a condenser embodying the capacities $C_a$, $C_b$ and $C_c$. Plates $a_1$, $b_2$ and $c_3$ are fixed or stationary. S is a shaft rotatable in opposite directions as indicated by the curved arrows in the figure. The shaft S carries plates $a_d$, $b_d$ and $c_d$, these four elements being in direct electrical connection and at the same potential. When the shaft rotates plate $a_d$ toward $a_1$ to increase capacity $C_a$, it also rotates plate $b_d$ toward $b_2$ to increase capacity $C_b$ and rotates plate $c_d$ away from $c_3$ to decrease the capacity of $C_c$.

The shape of the movable plates that is suitable for obtaining a desired relation between angle of rotation $\phi$, in degrees, and insertion loss of the attenuator, in decibels, can be obtained with the aid of Equations I to III which relate capacity and loss. Consider for example the simple case in which the desired relation between $\phi$ and decibel loss is linear, from zero loss at $\phi=180°$ to 48 decibel loss at $\phi=0$, the image impedances being $C_{01}=50$ micro-microfarads and $C_{02}=100$ micro-microfarads. Curve H of Fig. 13 represents the relation between angle and loss in such case. Curve L, showing the relation between the attenuator loss and the capacity of one of the elements or condensers, say $C_a$, of the attenuator, is computed, the formula for $C_a$ for example being I. Assuming $C_a$ made up of a 50 micro-microfarad fixed capacity plus a variable air condenser whose capacity will be designated $C_a'$, the values of $C_a'$ for different angles are given by the relation $C_a'=C_a-50$; so values of $C_a'$ corresponding to angles 30°, 45°, 60° . . . can be obtained from the corresponding values of $C_a$ given by the curve L for these angles. These values of $\phi$ and $C_a'$ are tabulated in the first two columns of the table below. The differences between successive values of $C_a'$ are designated $\Delta C$ and are tabulated in the third column; and these values of $\Delta C$ are employed as indicated below for obtaining the fourth column of the table.

| $\phi$ (degrees) | $C_a'$ | $\Delta C$ | $r/k$ |
|---|---|---|---|
| 30 | .71 | | 1.646 |
| 45 | 1.20 | .49 | 1.934 |
| 60 | 1.85 | .65 | 2.228 |
| 75 | 3.00 | 1.15 | 2.964 |
| 90 | 4.50 | 1.50 | 3.385 |
| 105 | 7.00 | 2.50 | 4.370 |
| 120 | 10.6 | 3.6 | 5.244 |
| 135 | 15.6 | 5.0 | 6.18 |
| 150 | 20.6 | 5.0 | 6.18 |

The capacity of a 15° sector of a set of circular disks of radius $r$ is $\pi r^2/24k^2$ where $k$ is a constant depending on the separation of the plates and the dielectric constant of the medium, assumed unity for an air condenser; so, from the successive values of $\Delta C$, the radii of successive sectors of the air condenser can be computed by the formula $$\pi r^2/24k^2 = \Delta C$$

The resulting values of $r/k$ are given in the table. The first value is given by $$\pi r^2/12k^2 = .71$$

that is, by assuming the first 30° as a sector of a circular condenser of radius $r$.

These values of $r/k$ plotted vs. $C_a$ give curve M; and $r/k$ vs. $\phi$ gives curve N.

The curves may be smoothed by computing for smaller angular differences if the curves M and N drawn through the points computed above are not sufficiently accurate for the purpose.

Figure 14:
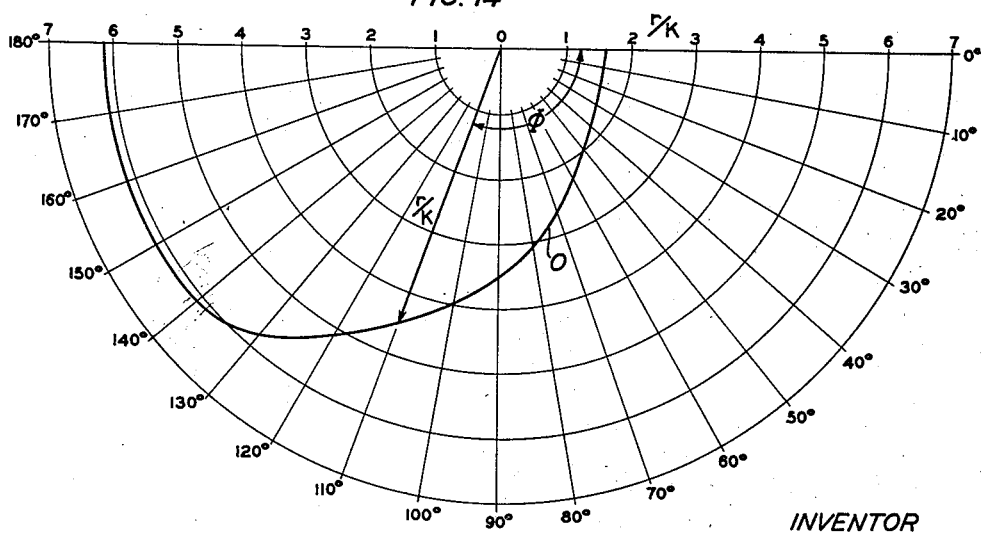

The polar curve corresponding to curve N is curve O in Fig. 14, which shows the shape of the movable plate $a_d$ of condenser $C_a$, the plates $a_1$ being, for example, semicircular with a radius at least as large as the maximum radius of plate $a_d$.

The shapes of the movable plates of condensers $C_b$ and $C_c$ can be determined in the manner indicated above for determining the shape of plate $a_d$, the Formulae II and III being used in the case of $C_b$ and $C_c$, respectively, instead of the Formula I.

The curves H, L, M, N and O show the relations between the angle of rotation, loss, capacity of one of the elements of the attenuator, and radius (except for a constant) of the movable air condenser giving the capacity, for a particular case. The same procedure can be followed for more complicated cases, as for example when the loss is not to be linearly proportional to the angle of rotation.

The general case will now be considered, for derivation of a general formula for the radius. An elemenetary area of a condenser rotor plate is $$\frac{\rho^2}{2}d\phi$$

and the element of capacity of a set of similar plates is $K\rho^2 d\phi$ where K is a constant. This element of capacity must equal $$dC = f'(\phi) d\phi$$

if $$C = f(\phi)$$

expresses the relation between capacity and angle.

Then $$K\rho^2 = f'(\phi)$$

However, the relation between capacity and angle is given indirectly through Equations I to III connecting capacity and loss, and the desired relation between angle and loss,
Then we have $$\theta = F(\phi)$$

$$C = f_1(\theta) = f_1(F(\phi))$$

$$dC = f_1'(F(\phi))\frac{d\theta}{d\phi} = f_1'(F(\phi)) \cdot F'(\phi)$$

and $$K\rho^2 = f_1'F(\phi)) \cdot F'(\phi) \, d\phi \qquad \text{IV}$$

This gives a means of computing $\rho$ for various values of the angle $\phi$ if the functional relations are known. The graphic procedure illustrated above may be applied where these relations are unknown or give too complicated form to Equation IV.

Another example of a structure realizing the attenuator of Fig. 1 is shown in Figs. 3 and 3A, which are, respectively, a left side or left end elevation and a front elevation of a condenser embodying the capacities $C_a$, $C_b$ and $C_d$. Plates $a_1'$, $b_2'$ and $c_3'$ are fixed or stationary, and correspond respectively to plates $a_1$, $b_2$ and $c_3$ of Figs. 1, 2 and 2A. $S'$ is a shaft rotatable in opposite directions, and corresponds to shaft $S$ of Figs. 2 and 2A. The shaft $S'$ carries two plates $d'$, these three elements being in direct electrical connection and at the same potential; and these three elements correspond to portions $d$, $a_d$, $b_d$ and $c_d$ of Figs. 1, 2 and 2A. When the shaft $S'$ rotates plates $d'$ toward $a_1'$ and $b_2'$ to increase $C_a$ and increase $C_b$, it also rotates the plates $d'$ away from plates $c_3'$, to decrease the capacity $C_c$. The use of two plates $d'$ (or a thick plate), instead of a single thin plate, tends to reduce the direct capacity between plates $a_1'$ and $b_2'$. If desired, either of the two plates $c_3'$ can be omitted.

Fig. 4 shows a circuit corresponding to that of Fig. 1 except that the T-network is replaced by a $\pi$ network of capacities $C_A$, $C_B$ and $C_C$ corresponding to the capacities $C_a$, $C_b$ and $C_c$ and forming an attenuator similar to that of Fig. 1.

Capacity $C_A$ comprises plates or armatures $A_1$ and $A_2$, which may be relatively movable for varying the capacity $C_A$; capacity $C_B$ comprises armatures $B_1$ and $B_3$, which may be relatively movable for varying the capacity $C_B$; and capacity $C_C$ comprises armatures $C_2$ and $C_3$, which may be relatively movable for varying the capacity $C_3$. Means may be provided, for example as indicated in Fig. 5 or in Figs. 6 and 6A described hereinafter for varying the capacity $C$, simultaneously with and in opposite sense to the capacity $C_B$ and $C_C$. In accordance with the invention the condenser plates may be shaped to give the above-mentioned properties (1), (2), (3) and (4). These properties may be obtained by designing the attenuator in accordance with the following formulae:

$$C_A = \frac{\sqrt{C_{01}C_{02}}}{\sinh \theta}$$

$$C_B = \frac{C_{01}}{\tanh \theta} - \frac{\sqrt{C_{01}C_{02}}}{\sinh \theta}$$

$$C_C = \frac{C_{02}}{\tanh \theta} - \frac{\sqrt{C_{01}C_{02}}}{\sinh \theta}$$

When $C_B = C_C$ the image capacities $C_{01}$ and $C_{02}$ are equal and the $\pi$ is symmetrical.

The variable attenuator of Fig. 4 may be realized for example in the structure shown in Fig. 5, which is a front elevation of a condenser embodying the capacities $C_A$, $C_B$ and $C_C$. Plates $B_1$, $C_2$ and $A_1$ are fixed or stationary. $S_1$ and $S_2$ are electrically conducting sections of a shaft which are separated by an insulating section $S_3$, the shaft being reversibly rotatable. The section $S_1$ carries plates $B_3$ and $C_3$, which are connected to terminal $3$; and the section $S_2$ carries plate $A_2$, which is connected to terminal $2$. When the shaft rotates plate $A_2$ toward $A_1$ to increase capacity $C_A$, it also rotates plate $B_3$ away from $B_1$ to decrease capacity $C_B$ and rotates plate $C_3$ away from $C_2$ to decrease capacity $C_C$.

Another example of a structure realizing the attenuator of Fig. 4 is shown in Figs. 6 and 6A, which are, respectively, a left side or left end elevation and a front elevation of a condenser embodying the capacities $C_A$, $C_B$ and $C_C$. Plate $A_1$, $B_1$ is connected to terminal $1$, corresponds to plates $A_1$ and $B_1$ of Figs. 4 and 5, and is fixed or stationary; and plate $A_2$, $C_2$ is connected to terminal $2$, corresponds to plates $A_2$ and $C_2$ of Figs. 4 and 5, and is fixed or stationary. $S_4$ is a shaft rotatable in opposite directions, and carries plate $B_3$, $C_3$, which is connected to terminal $3$ and which corresponds to plates $B_3$ and $C_3$ of Figs. 4 and 5. Shaft $S_4$ also carries an insulating bushing or sleeve $4$ which rotates with the shaft and on which is mounted a thick plate $E$ for rotation with the shaft. If desired, the plate $E$ may be hollow, or may be two thin plates electrically connected together. Capacity $C_B$ is the capacity between plate $A_1$, $B_1$ and plate $B_3$, $C_3$; and capacity $C_C$ is the capacity between plate $A_2$, $C_2$ and plate $B_3$, $C_3$. Capacity $C_A$ is made up of three components, $C_A'$ in parallel with $C_{1E}$ and $C_{2E}$ in series. The component $C_A'$ is the direct capacity between plate $A_1$, $B_1$ and plate $A_2$, $C_2$; the component $C_{1E}$ is the capacity between plate $A_1$, $B_1$ and plate $E$, and the component $C_{2E}$ is the capacity between plate $A_2$, $C_2$ and plate $E$. When shaft $S_4$ rotates plate $B_3$, $C_3$ away from $A_1$, $B_1$ and $A_2$, $C_2$ to decrease the capacities $C_B$ and $C_C$ and increase component $C_A'$, the shaft also rotates plate $E$ toward plate $A_1$, $B_1$ and plate $A_2$, $C_2$ to increase the components $C_{1E}$ and $C_{2E}$.

Any of the attenuators described above may be readily designed to give a loss in terms of voltage ratio of, for example, 40 to 80 decibels for a single T or $\pi$ section and operate with a single control calibrated directly in terms of loss. This type of variable attenuator is cheaper to build, quicker to operate, and, particularly at high frequencies, easier to calibrate and more accurate than the resistance type of variable attenuators now in use. The variable condenser attenuator can be put in series with any number of variable or fixed T or $\pi$ capacity attenuators of the same image capacities and the losses of the string of attenuators directly added.

That is, the attenuators can be connected in tandem to form a network group, with the image impedances of successive networks matched at each junction, and with the group terminated in its image impedances, the transfer constant of the group then being the sum of the transfer constants of the individual networks.

Fig. 7 shows an example of this in application of the attenuator to measurement of attenuation (insertion loss). The circuit of this figure is of the general type of that of Blackwell Patent 1,261,096, April 2, 1918, for measuring transmission loss by the comparison or substitution method. An oscillator or other suitable source $6$ of voltage of the frequency for which the loss measurements are to be made, supplies current through two branch circuits to a circuit which comprises detector 7 and milliammeter 8 and which can be connected to either branch by transfer switch 9. The lower branch comprises the unknown network 10 whose attenuation is to be measured and proper terminating impedances 11 and 12. The upper branch comprises a fixed pad or attenuator 13, a zero balancing pad 14 and a calibrated attenuator 15.

The attenuator 15 is shown by way of example as a T-network of variable capacities $C_a$, $C_b$ and $C_c$, such as that of Fig. 1, and may be for instance of the type shown in Figs. 2 and 2A or the type shown in Figs. 3 and 3A; and the pad 14 may be an attenuator of similar type. Each of these attenuators 13 and 14 may be designed as indicated above with its plates shaped to give a constant image capacity independent of their angular setting. Networks 14 and 15 may have their image capacities at their junction matched; the network 13 may match the image impedance of network 14; and condenser 16 may terminate the network 15 in its image impedance at its output terminals. If desired, a dial (not shown) may be connected to the shaft (S or S') of attenuator 15, to indicate the angular setting of the plates of the attenuator, and may be calibrated directly in attenuation units. This attenuator may be designed to have a wide variation of attenuation, for example 40 decibels or more, with adjustment by means of a vernier if high precision is desired. Designating the input and output voltages of the upper branch circuit of Fig. 7 as $V_1$ and $V_2$, respectively, the insertion loss of this branch is $$20 \log \frac{V_2}{V_1}$$

and designating the input and output currents of the unknown network 10 as $I_1$ and $I_2$, respectively, as indicated by the arrows in the figure, the insertion loss of this network is $$20 \log \frac{I_2}{I_1}$$

These two losses are equal when the readings of the meter 8 are the same for the alternate positions of switch 9. As indicated above, a variable attenuator such as 15 is accurate over a much wider range of frequency than a resistance type variable attenuator. The accuracy of the attenuation measurements or circuit readings given by the circuit of Fig. 7 is independent of frequency when the admittance of grid leak 17 is made high compared to the capacity 16.

In making measurements, resistances or impedances 11 and 12 are adjusted to the values of the impedances between which the performance of the network is to be determined. The unknown network is removed and the terminals connected by parallel wires to preserve the configuration of the line. The fixed (standard) pad is removed from the other branch of the circuit and the calibrated attenuator is set on zero. The switch is shifted from one position to the other and the zero balance pad is adjusted until the detector shows equal readings for the two switch positions. The unknown network is replaced and the calibrated attenuator adjusted (in conjunction with the fixed standard pad, if the pad is necessary), until the detector readings are the same for both switch positions. The loss of the unknown network then equals the reading of the calibrated attenuator plus the fixed pad.

Any of the T or $\pi$ variable attenuators described above may be applied to gain control in tuned circuits, for example, as illustrated by such application of the T form of attenuator in the vacuum tube circuits of Figs. 8 to 10. These vacuum tube circuits may be, for instance, tuned amplifiers or modulators, of radio sets, for example. The attenuator is shown as an element 20 of the circuit coupling tubes 21 and 22, and as working into a capacity 23. The capacity 23 is the image capacity of the attenuator at its output end. The impedance of capacity 23 may be, or may include, the capacitive component of the effective input impedance of a load (such for example as vacuum tube 22) whose remaining component of effective input impedance is high compared to the impedance of capacity 23. The input capacity of the attenuator is designated $C_0$ as indicated on the drawings, and is the image capacity of the network at its input end. This capacity is independent of the attenuator setting, i. e., its loss. Therefore, this capacity can form a fixed part of a tuning capacity, the remainder of which may be either fixed or variable, and the loss of the attenuator can be varied without altering the tuning capacity or interfering with the variation of the tuning.

For example, in Fig. 8 the tuning circuit is constituted by inductance 25, adjustable capacity $C_{T2}$ and fixed capacity $C_0$, all in parallel; in Fig. 9 the tuning can be set by adjustable capacity $C_{T2}$ and coupling coil 26, the capacity $C_0$ being constant; and in Fig. 10 the tuning can be varied by adjustable capacity $C_{T2}$ which, in parallel with the fixed capacity $C_0$, is in series with tuning inductance 27. Tuned amplifiers or modulators such as those of Figs. 8 to 10 may be operated by first adjusting the variable portion $C_{T2}$ of the tuning capacity, and then controlling the gain by adjustment of the attenuator 20. Such gain adjustment does not disturb the tuning.

In accordance with the invention, any of the T or $\pi$ variable attenuators described above may be applied to control of retroaction or feed-back in wave translating systems, for example, as illustrated in Figs. 11 and 12 by application of the T form of attenuator to automatic gain control of amplifiers for compensating transmission line attenuation changes. These changes may be due for example to variation of temperature or other weather conditions to which the line is subjected.

In Fig. 11 an amplifier comprising vacuum tubes 31, 32 and 33 in cascade connection, receives waves from incoming line or circuit $L_1$ terminated in amplifier input transformer $T_1$ and transmits the amplified waves through amplifier output transformer $T_2$ to outgoing line or circuit $L_2$. The circuits $L_1$ and $L_2$ may be, for example, sections of a multiplex carrier cable or open wire circuit, the amplifier amplifying simultaneously the waves of a number of carrier telephone channels and/or carrier telegraph channels, extending over a wide frequency range, for instance, the range from 8 to 56 kilocycles per second.

The amplifier may have a forwardly transmitting path comprising the tubes 31, 32 and 33, and a feed-back path P, and be of the general type of negative feed-back amplifier in which waves, including those of the range of transmitted frequencies, are so fed back through the feed-back path from the output to the input of the forwardly transmitting path as to reduce the gain of the amplifier below the value that it would have without feed-back, in order to reduce unwanted modulation or non-linear effects and render the gain stability greater than it would be without feed-back. That type of amplifier is disclosed, for example, in the copending application of H. S. Black, Serial No. 606,871, filed April 22, 1932, for Wave translation systems, and in H. S. Black's article on Stabilized feed-back amplifiers, published in Electrical Engineering, January, 1934, pages 114 to 120. Herein, as in those disclosures, $\mu$ designates the propagation of the forwardly transmitting path of the amplifier and $\beta$ the propagation of the feed-back path, the quantity $\mu\beta$ designating the modification that a voltage undergoes in transmission once around the closed feed-back loop. The quantity $\mu\beta$ may be large compared to unity, as for example of the order of 50 or 100; and $\mu$ may be large compared to $\beta$.

A transmission equalizing network N having a terminating resistance 35 is shown in the feed-back path P. The network N may be, for example, an attenuation equalizer of the type of equalizer 374 shown in Fig. 65 of the above-mentioned copending application 606,871, or in Fig. 4 of the above-mentioned Patent 1,956,547, with its attenuation-frequency characteristic like that of the cable or line in which the amplifier is connected, so that the amplifier will equalize the line attenuation. As explained in the above-mentioned copending application 606,871 and the above-mentioned published article, and also in the above-mentioned Patent 1,956,547 and in British 371,887, the frequency variation of the equalizer attenuation contributes like frequency variation to the over-all gain of the amplifier, so if the attenuation-frequency characteristic of the equalizer is made similar to that of the line or circuit to be equalized, instead of complementary to it as in the usual case of an equalizer in a line, the equalizer tends to compensate for the variation of the attenuation of the line with frequency.

In accordance with the present invention, the over-all gain of the amplifier may be controlled by a condenser attenuator, which may be, for example, the variable attenuator of Figs. 2 and 2A or that of Figs. 3 and 3A described above, comprising variable capacities $C_a$, $C_b$ and $C_c$, and which may have its input terminals 1 and 3 connected across the equalizer terminating resistance 35 and its output terminals 2 and 3 connected in series with the secondary winding of the amplifier input transformer. Its image capacities are not necessarily made constant. The over-all gain of the amplifier can be varied uniformly or the same amount at each frequency, over the utilized frequency range, by adjusting the setting of the attenuator.

The adjustment may be made manually. However, if desired it may be made automatically, for example, by pilot wire or pilot channel control equipment indicated at 36. For instance, the equipment 36 may be automatic pilot wire transmission regulator control equipment such as that which operates transmission regulating rheostat 12 of the system disclosed in the above-mentioned Patent 1,956,547, May 1, 1924, or such as that of Shackleton-Edwards Patent 1,960,350, May 29, 1934, Case 26-16; or may be automatic pilot channel transmission regulator control equipment such as that which operates the equalizer-potentiometer 36, 37 of Affel Patent 1,511,013 October 7, 1924, Case 24, or such as that of R. W. Chesnut application Serial No. 5,696, filed February 9, 1935, for Gain control circuits. The control equipment 36 may thus cause the attenuator to compensate for line attenuation changes, for example, changes produced by temperature or other weather changes to which the line is subjected.

The capacities $C_a$ and $C_c$ form a condenser potentiometer in the feed-back path P. $C_a$ and $C_c$ are series and shunt elements, respectively, in the path P. Capacity in shunt to the feed-back path P, as for example the capacity to ground of transformer $T_1$ appearing between 2 and 3, ordinarily introduces phase shift objectionable as tending to produce singing (for example tendency of the amplifier to sing at a frequency well above the utilized frequency range). The capacity $C_b$ can be designed to correct for (a) errors due to shunting the output of the equalizer by the condenser potentiometer formed by $C_a$ and $C_c$, or (b) the error caused by the impedance of the loop 3, $d$, G, 3 including the effective input capacity $C_g$ of tube 31 and the inherent capacity to ground of transformer $T_1$, which is effectively connected across terminals 2 and 3. With reference to (a), at high frequencies the net capacity shunted around 35, which depends on all the capacities shown as well as on the capacity of the transformer to ground, tends to produce undesirable phase shift. This capacity can be reduced to a minimum by properly designing $C_a$, $C_b$ and $C_c$ with reference to reducing the effect of the transformer capacity to ground. With reference to (b), $C_a$, $C_b$ and $C_c$ may be designed to keep the loop impedance G—3—$d$ attached to the secondary winding of transformer $T_1$ constant. Both conditions cannot be simultaneously realized but may be approximately realized in many cases.

Even with $C_b$ omitted, (for example made very large, or short circuited), the condenser potentiometer affords a desirable gain control means, advantageous especially as regards avoiding introduction of an undue amount of phase shift in the feed-back path. With $C_b$ omitted, (and the sum of the impedance of transformer $T_1$ and the impedance of capacity $C_g$, in series, large compared to the combined impedance of the capacity $C_c$ and the parallel connected capacity to ground of the transformer), the phase shift in the feed-back path will be less with the condenser potentiometer than with a resistance potentiometer or a variable resistance shunted across the equalizer output for gain control, as long as the equivalent capacity of $C_a$ in series with the two parallel capacities $C_c$ and the capacity to ground of transformer $T_1$, is less than the capacity shunted across the equalizer output (including the capacity to ground of the transformer) when the gain control is obtained by the resistance potentiometer or the shunt resistance. Moreover, to the extent that the capacity $C_c$ is made to include the capacity to ground of the transformer, the reduction in phase shift can be improved.

Fig. 12 shows a system like that of Fig. 11 except that the network N is replaced by an attenuation equalizing network N' and the condenser attenuator comprising the capacities $C_a$, $C_b$ and $C_c$, has its input terminals 1 and 3 connected across the series arms of the equalizer and its output terminals 2 and 3 connected in series with the equalizer terminating resistance 35 and the amplifier input.

The capacities $C_a$ and $C_c$ form a condenser potentiometer having input terminals 1 and 3 and output terminals $d$ and 3. This condenser potentiometer forms with the equalizer N' and its terminating resistance 35, a potentiometer equalizer having as its input terminals the input terminals of the equalizer N' and having output terminals $d$ and 39. As pointed out in the copending application of C. R. Eckberg, Serial No.

5,717, filed February 9, 1935 for Transmission regulating systems, the potentiometer of a potentiometer equalizer of this general type can be adjusted to obtain, between the input terminals and the output terminals of the potentiometer equalizer, a voltage attenuation that is any desired fraction of the total voltage attenuation of the equalizer N'. Thus, varying the setting of the potentiometer varies the attenuation of the potentiometer equalizer so as to give the same attenuation change that would be obtained from the network N' by constructing the network of a large number of similar sections of very small attenuation per section and varying, one by one, the number of tandem connected sections included in circuit.

The network N' may be so designed that the frequency variation of its attenuation simulates the frequency variation of the difference between the maximum line attenuation (corresponding for example to the line's attenuation-frequency characteristic for maximum line temperature), and the minimum line attenuation (corresponding for example to the line's attenuation-frequency characteristic for minimum line temperature). That is, the network's attenuation-frequency characteristic may simulate the characteristic that represents the difference between the line's highest and lowest attenuation-frequency characteristics. Then, with $C_b$ omitted (or made very large or short-circuited), the setting of the potentiometer can be varied to vary the over-all gain of the amplifier in such manner as to compensate for the variation of the line attenuation due to the temperature changes or other weather changes to which the line is subjected.

The addition of the condenser $C_b$ serves the same purpose as in the case of the system of Fig. 11. Moreover, it increases the flexibility of the equalizer. That is, with three variable elements in the system the loss of the equalizer may be varied as the loss of a series of small equalizers might be and a flat loss independent of frequency added in amount having any desired relation to the amount of equalization as represented by the number of the small equalizers that would be required in circuit to produce such amount of equalization.

What is claimed is:

1. A wave translating system comprising wave amplifying means, a feed-back path for producing negative feed-back in said amplifying means, and means comprising a condenser potentiometer in said path for varying the gain of said amplifying means, said potentiometer having capacities serially related to each other with respect to voltage transmitted to the potentiometer from the output side of said amplifying means.

2. A wave transmission system comprising a carrier wave transmission line subject to changes in weather conditions, an amplifier associated therewith for amplifying carrier waves of a wide frequency range transmitted over said line, a feed-back path for producing negative feed-back in said amplifying means, and means for compensating for attenuation variations produced in said line by said changes, said means comprising a condenser potentiometer in said path for varying the gain of said amplifying means and means responsive to effects of said changes for adjusting said potentiometer, said potentiometer having capacities serially related to each other with respect to voltage transmitted to the potentiometer from the output side of said amplifying means.

3. A wave translating system comprising a vacuum tube amplifier, a feed-back path for producing negative feed-back in said amplifier, said path comprising a transmission equalizing network and a condenser potentiometer having an impedance connected to said network and a portion only of said impedance connected to the input circuit of said amplifier.

4. A wave translating system comprising a vacuum tube amplifier, and a feed-back path for producing negative feed-back in said amplifier, said path comprising a transmission equalizing network, a terminating impedance for said network, and a condenser potentiometer having serially related capacities connected by its input circuit in shunt relation to at least a portion of said impedance and its output circuit connected across a portion only of said capacities and to the input circuit of said amplifier.

5. A wave translating system comprising a vacuum tube amplifier having a cathode and a grid, an incoming circuit for supplying to said grid and cathode waves to be amplified by said amplifier, a feed-back path for producing negative feed-back in said amplifier, an attenuation equalizer in said feed-back path, and a T-network of condensers in said path for controlling the gain of said amplifier and the impedance into which said equalizer works, one of the arms of said network being in serial relation to said incoming circuit with respect to the grid-cathode path in the amplifier.

EDWARD B. PAYNE.